(12) United States Patent
Kim et al.

(10) Patent No.: US 9,886,129 B2
(45) Date of Patent: Feb. 6, 2018

(54) DISPLAY DEVICE AND METHOD OF DRIVING THE SAME

(71) Applicant: LG DISPLAY CO., LTD., Seoul (KR)

(72) Inventors: Sung Chul Kim, Goyang-si (KR); Hoon Bae Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 320 days.

(21) Appl. No.: 14/698,368

(22) Filed: Apr. 28, 2015

(65) Prior Publication Data

US 2015/0309661 A1 Oct. 29, 2015

(30) Foreign Application Priority Data

Apr. 28, 2014 (KR) ........................ 10-2014-0050827

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 3/0416* (2013.01)

(58) Field of Classification Search
CPC .... G06F 3/0418; G06F 3/0416; G06F 3/0412; G06F 3/044
USPC ................................................. 345/173–179
See application file for complete search history.

(56) References Cited

U.S. PATENT DOCUMENTS

| 2009/0267917 A1 | 10/2009 | Lee et al. |
| 2012/0075239 A1* | 3/2012 | Azumi ................... G06F 3/044 345/174 |
| 2012/0162104 A1 | 6/2012 | Chang et al. |
| 2014/0049486 A1 | 2/2014 | Kim et al. |
| 2014/0049507 A1 | 2/2014 | Shepelev et al. |
| 2014/0146246 A1 | 5/2014 | Ma et al. |
| 2015/0042597 A1* | 2/2015 | Wang ..................... G06F 3/0418 345/174 |

(Continued)

FOREIGN PATENT DOCUMENTS

| CN | 101566747 | 10/2009 |
| CN | 103279237 | 9/2013 |

(Continued)

OTHER PUBLICATIONS

First Office Action for Chinese Patent Application No. CN 201510205012.2, Jul. 27, 2017, 9 Pages (With English Translation).

*Primary Examiner* — Amit Chatly
(74) *Attorney, Agent, or Firm* — Fenwick & West LLP

(57) ABSTRACT

Discussed are a display device and a method of driving the same. The display device can include a panel where a plurality of touch groups including a plurality of self-capacitance electrodes are arranged along with a plurality of gate lines, a touch sensing unit configured to analyze a plurality of touch sensing signals sequentially received from the plurality of touch groups to determine a touch event on the panel, during a plurality of touch sensing periods included in one frame period, a data driver configured to respectively supply data voltages to a plurality of data lines which are provided in the panel in a direction perpendicular to the plurality of touch groups, a gate driver configured to sequentially supply a scan pulse to the plurality of gate lines, and a timing controller configured to supply image data to the data driver.

15 Claims, 6 Drawing Sheets

(56) References Cited

U.S. PATENT DOCUMENTS

2015/0091587 A1* 4/2015 Shepelev ............... G06F 3/044
 324/658
2016/0334934 A1 11/2016 Mo et al.

FOREIGN PATENT DOCUMENTS

| CN | 103593083 | 2/2014 |
| CN | 103698927 | 4/2014 |

* cited by examiner (a)

(b)

(c)

(d)

(e)

(f)

(a)

(b)

DISPLAY DEVICE AND METHOD OF DRIVING THE SAME

CROSS-REFERENCE TO RELATED APPLICATIONS

This application claims the priority benefit of the Korean Patent Application No. 10-2014-0050827 filed on Apr. 28, 2014, which is hereby incorporated by reference as if fully set forth herein.

BACKGROUND

Field of the Invention

The present invention relates to a display device and a method of driving the same, and particularly, to a display device where a touch panel is integrated within a panel and a method of driving the same.

Discussion of the Related Art

Touch panels are coordinate input devices. Touch panels are attached to display devices such as liquid crystal display (LCD) devices, plasma display panels (PDPs), organic light emitting display device (OLED), and electrophoretic displays (EPDs). A touch panel enables a user to input information by directly touching the touch panel with a finger, a pen or the like while looking at the screen of the display device.

A method of manufacturing an LCD device including a touch panel includes an add-on type, where a panel is configured to display an image and a touch panel that is configured to determine a touch event are separately manufactured and bonded to each other, and an in-cell type where the touch panel is built into the panel for displaying an image.

Recently, the demand for an in-cell type display device, in which a touch panel is integrated into a panel for slimming portable terminals such as smart phones and tablet personal computers (PCs), is increasing.

The in-cell type display device may be divided into a mutual-capacitance type and a self-capacitive type.

FIG. 1 is an exemplary diagram illustrating a related art self-capacitance display device.

The related art self-capacitance display device, illustrated in FIG. 1, includes a panel 10, where a touch panel 50 includes a plurality of self-capacitance electrodes 51, and a touch sensing unit 60 configured to determine a touch event by supplying a touch voltage to the touch panel 50. A plurality of touch lines 52 that connect the self-capacitance electrodes 51 to the touch sensing unit 60 are arranged in parallel with a plurality of data lines which are provided in the panel 10. For example, a vertical direction is a direction parallel to a data line, and a horizontal direction is a direction parallel to a gate line 21 as illustrated in FIG. 1. The term "touch event" may be referred as "whether there is a touch on the panel".

A plurality of touch groups 53 comprising a plurality of self-capacitance electrodes 51 are arranged along the data lines. The touch groups 53 are driven by a multiplexers (MUX1 to MUX3) 61 of the touch sensing unit 60.

The touch groups 53 are extended along the vertical direction of the panel 10. The touch groups 53 are positioned in series along the horizontal direction of the panel 10. Therefore, a gate line is extended through all of the touch groups 53 of the panel 10.

In the related art self-capacitance display device, display-to-touch crosstalk (DTX) problemoccurs. The term DTX preferably means a level of touch raw data (e.g. magnitude of the sensed touch signal) is shifted due to a change of the charged capacitance of a liquid crystal. For example, the charged capacitance of the liquid crystal may be changed when an image data is refreshed by every frame. When a data voltage is supplied to a pixel electrode through a data line, the liquid crystal is affected by the data voltage applied to the pixel electrode and a common electrode (e.g. self-capacitance electrodes) is affected through the liquid crystal, in term of parasitic capacitance. That is, an electric field is generated between the pixel electrode and the common electrode to derive the liquid crystal for displaying an image may cause unwanted noise for the touch. Consequently, DTX is occurred within the panel 10 and the DTX may be affected to the touch panel 50 which is attached to the panel 10.

In addition, the magnitude of the DTX is seriously increased when the touch panel 50 is integrated into the panel 10. This is because the self-capacitance electrodes 51 are configured with the common electrode of the panel 10.

For example, when an image is refreshed from a black image ($0^{th}$ Gray level), which may be referred as the lowest gray level (e.g. 8-bit image format), to a white image ($255^{th}$ Gray level), which may be referred as the highest gray level (e.g. 8-bit image format), for one frame period, a gap between two different gray levels may represent the magnitude of the DTX. For example, the black to white change may be referred as the maximum magnitude of the DTX. In addition, the magnitude of the DTX may be proportional to the gap between the gray level of the previous frame (e.g. black image) and the gray level of the current frame (e.g. white image) of a pixel.

A method, which analyzes pattern information of an image when touch sensing is being performed and compensates for a level of a sensing signal on the basis of the analyzed pattern information, is used for compensating for DTX.

However, in the related art self-capacitance display device as illustrated in FIG. 1, when touch sensing is being performed with the touch groups 53 which are arranged along the data lines, a method of compensating for DTX becomes very complicated. For this reason, a memory size associated with DTX compensation needs to be increased, and a complexity of calculation is also increased. Consequently, there are many difficulties to eliminate the DTX and a large compensation error may occur.

In other words, in the related art self-capacitance display device as illustrated in FIG. 1, the arrangement of the touch groups 53 is mismatched with the arrangement of the pixels within the panel 10. Therefore, for every touch sensing period, the compensation data needs to be updated. For this reason, a large compensation error may occur.

Moreover, in the panel 10 where the touch groups 53 are arranged in a vertical direction, the touch lines 52 that connect the self-capacitance electrodes 51 to the touch sensing unit 60 are arranged in parallel with the data lines. Therefore, a parasitic capacitance C occurs between the touch lines 52 and the data lines, causing touch noise.

Moreover, the self-capacitance type touch panel is more sensitive than the mutual-capacitance type touch panel in terms of DTX noise. Therefore, the DTX noise should be eliminated for implementing the self-capacitance type.

Moreover, when the self-capacitance type touch panel is implemented as an in-cell type, the magnitude of the DTX noise may be significantly increased. Therefore, the DTX noise should be eliminated for implementing the in-cell type self-capacitance touch panel.

SUMMARY

Accordingly, the present invention is directed to provide a display device and a method of driving the same that substantially obviate one or more problems due to limitations and disadvantages of the related art.

An aspect of the present invention is directed to provide a display device and a method of driving the same, which analyze a plurality of touch sensing signals sequentially received from a plurality of touch groups arranged along a plurality of gate lines to determine a touch event on a panel, during a plurality of touch sensing periods which are provided in one frame period.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device which can include: a panel where a plurality of touch groups having a plurality of self-capacitance electrodes are arranged along a plurality of gate lines; a touch sensing unit configured to analyze a plurality of touch sensing signals sequentially received from the plurality of touch groups to determine a touch event on the panel, during a plurality of touch sensing periods included in one frame period; a data driver configured to respectively supply data voltages to a plurality of data lines which are provided in the panel in a direction perpendicular to the plurality of touch groups; a gate driver configured to sequentially supply a scan pulse to the plurality of gate lines; and a timing controller configured to supply image data to the data driver.

In another aspect of the present invention, there is provided a method of a display device including: when one of a plurality of displaying periods within one frame period commences, sequentially supplying a scan pulse to a plurality of gate lines which are arranged in a first direction of a panel, supplying a common voltage to an $n^{th}$ touch group, corresponding to a plurality of gate lines to which the scan pulse is supplied, among a plurality of touch groups which are arranged along the first direction, and displaying an image on a plurality of pixels corresponding to the plurality of gate lines to which the scan pulse is supplied; when one of a plurality of touch sensing periods included in the one frame period commences, analyzing a plurality of touch sensing signals received from an $m^{th}$ touch group of the plurality of touch groups to determine a touch event on a plurality of self-capacitance electrodes configuring the $m^{th}$ touch group; and within the one frame period, repeatedly performing an operation of displaying the image and an operation of determining a touch event.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings. Hereinafter, for convenience of a description, an LCD device will be described as an example of the present invention, but the present invention is not limited thereto. That is, the present invention may be applied to various display devices.

Figure 1:
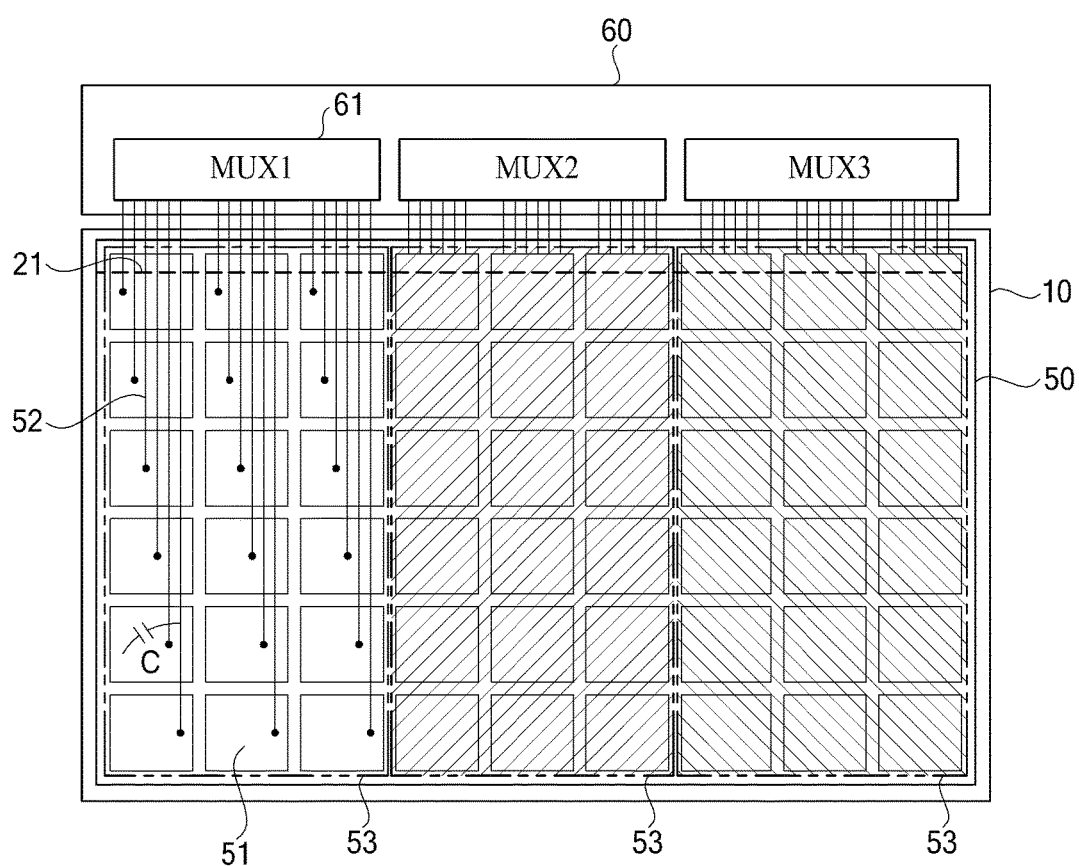
FIG. 1 is an exemplary diagram illustrating a related art self-capacitance display device.
Figure 2:
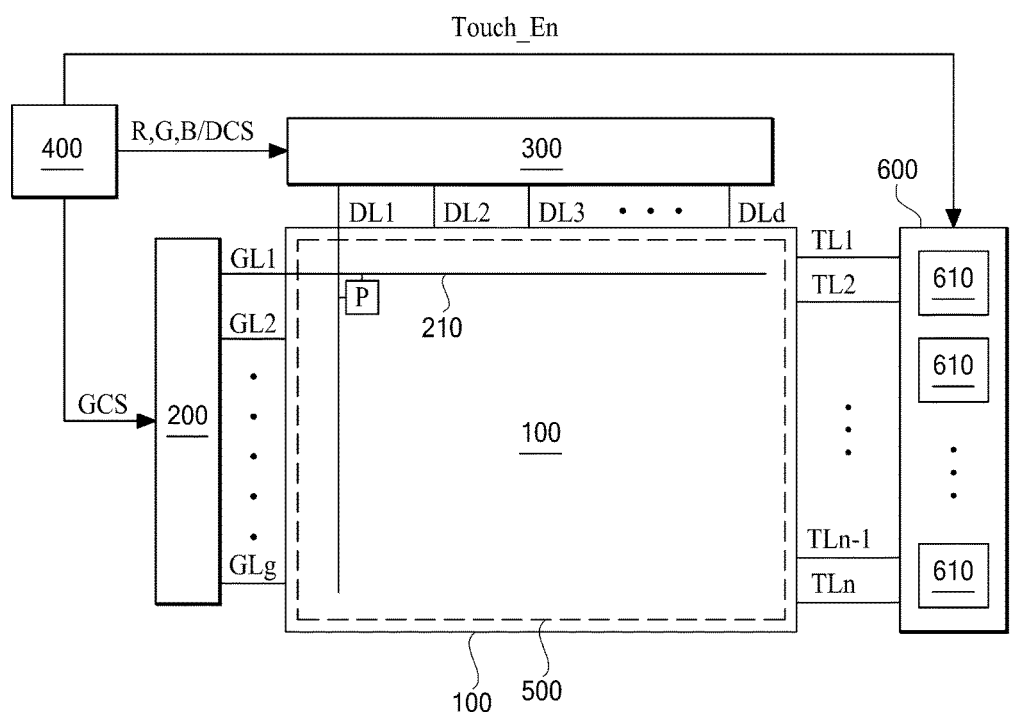
FIG. 2 is an exemplary diagram schematically illustrating a configuration of a display device according to an embodiment of the present invention.
Figure 3:
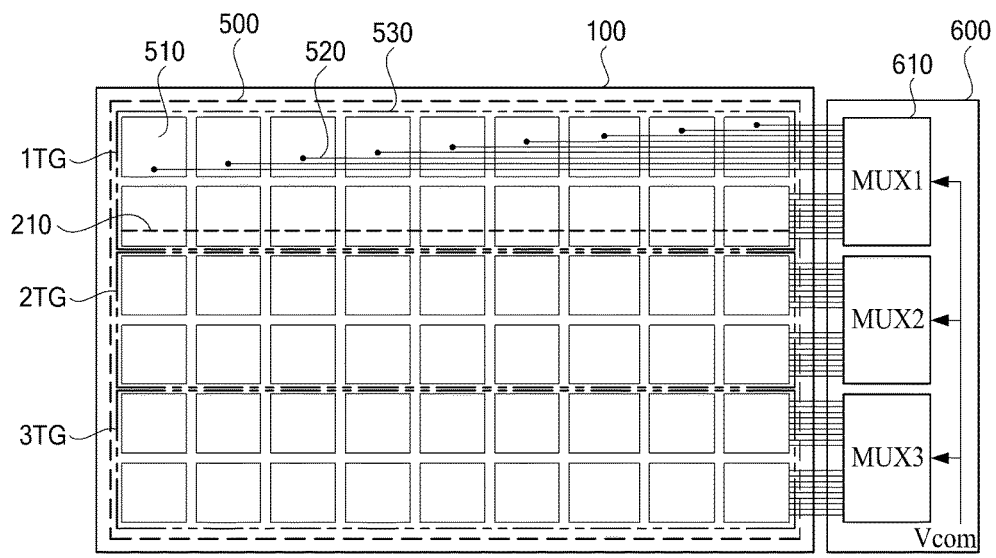
FIG. 3 is an exemplary diagram illustrating configurations of a panel and a touch sensing unit applied to a display device according to an embodiment of the present invention.

FIG. 2 is an exemplary diagram schematically illustrating a configuration of a display device according to an embodiment of the present invention. FIG. 3 is an exemplary diagram illustrating configurations of a panel and a touch sensing unit applied to a display device according to an embodiment of the present invention and illustrates a panel 100 including three touch groups (1TG to 3TG) and a touch sensing unit 600 including three multiplexers (MUX1 to MUX3). But the present invention is not limited to the number of the touch groups or the numbers of the multiplexers.

As illustrated in FIGS. 2 and 3, the display device according to an embodiment of the present invention includes: a panel 100 where a plurality of touch groups 530 comprising a plurality of self-capacitance electrodes 510 are arranged along a plurality of gate lines (GL1 to GLg); a touch sensing unit 600 that analyzes a plurality of touch sensing signals sequentially received from the plurality of touch groups 530 to determine a touch event on the panel 100, during a plurality of touch sensing periods which are provided within one frame period; a data driver 300 that respectively supplies data voltages to a plurality of data lines (DL1 to DLd) which are provided in the panel 100 in a direction perpendicular to the plurality of touch groups 530; a gate driver 200 that sequentially supplies a scan pulse to the plurality of gate lines (GL1 to GLg); and a timing controller 400 that supplies image data to the data driver 300. In the present disclosure, for example, the term "determine a touch event" may be referred as "a touch event" or "a sensed touch coordinates". All the components of the panel in this and other embodiments are operatively coupled and configured.

First, the panel 100 comprises the touch panel 500. The touch panel 500 comprises a plurality of touch groups (1TG to 3TG). Each touch group comprises a plurality of the self-capacitance electrodes 510. The touch panel 500 and the panel 100 will be separately described in detail with reference to FIG. 3.

When the panel 100 is a liquid crystal panel, a lower substrate (a TFT substrate) of the panel 100 may include the plurality of data lines (DL1 to DLd), the plurality of gate lines (GL1 to GLg) which vertically intersect the plurality of data lines (DL1 to DLd), a plurality of TFTs which are respectively provided in a plurality of pixels P respectively defined by intersections of the plurality of data lines (DL1 to DLd) and the plurality of gate lines (GL1 to GLg), a plurality of pixel electrodes which are respectively provided in the corresponding pixels P and respectively charge data voltages to the corresponding pixels P, and a plurality of common electrodes coupled with the plurality of pixel electrodes to drive the liquid crystal disposed within the plurality of pixels P.

The plurality of pixels P may be arranged in a matrix type by an intersection structure of the data lines (DL1 to DLd) and the gate lines (GL1 to GLg). A TFT, a pixel electrode, and a common electrode may be provided in each of the plurality of pixels P.

In this case, the self-capacitance electrodes 510 may function as the common electrodes. Referring to FIG. 3, one self-capacitance electrode 510 may be provided to cover one or more pixels. For example, one self-capacitance electrode 510 may cover over 2000 pixels. For example, one self-capacitance electrode 510 may be a square shape of (3.5 mm to 5 mm) by (3.5 mm to 5 mm) size. For example, one self-capacitance electrode 510 may cover 48 pixels P by 48 pixels P in horizontal and vertical axis. A pixel P may comprise three sub pixels such as red sub pixel, green sub pixel and blue sub pixel.

Black matrix and color filter may be provided on an upper substrate (a color filter (CF) substrate) of the panel 100.

A polarizer may be attached to each of the upper glass substrate and lower glass substrate of the panel 100, and an alignment layer for setting a pre-tilt angle of the liquid crystal may be provided on an inner surface facing the liquid crystal. A plurality of column spacers CS for maintaining respective cell gaps may be provided between the upper glass substrate and the lower glass substrate of the panel 100.

However, the panel 100 may be an organic light emitting panel or various kinds and types of panels, in addition to the example of being the liquid crystal panel.

Second, the timing controller 400 may receive a plurality of timing signals, such as a data enable signal DE, a dot clock CLK, etc., from an external system to generate control signals GCS and DCS for controlling operation timings of the data driver 300 and the gate driver 200.

Moreover, the timing controller 400 may rearrange input video data received from the external system to output the rearranged image data to the data driver 300.

Gate control signals GCS generated by the timing controller 400 may include a gate start pulse GSP, a gate shift clock GSC, and a gate output enable signal GOE.

Data control signals DCS generated by the timing controller 400 may include a source start pulse SSP, a source shift clock signal SSC, a source output enable signal SOE, and a polarity control signal POL.

The timing controller 400 may generate a touch control signal Touch_En for controlling an operation timing of the touch sensing unit 600 to control the touch sensing unit 600.

That is, the timing controller 400 may generate a touch sync signal TSS for repeating a plurality of displaying periods and a plurality of touch sensing periods in one frame period and transfer the touch sync signal TSS to the touch sensing unit 600.

The timing controller 400 may comprise a memory. The timing controller 400 may be connected to an external memory. The memory may store the image data corresponding to the previous frame and the image data corresponding to the current frame.

Third, the data driver 300 converts the image data in a digital format, received from the timing controller 400, into the analogue data voltages. The scan pulse is supplied to a gate line for one horizontal period and the data voltages are supplied to the corresponding data lines for every one horizontal period. That is, the data driver 300 converts the image data into the data voltages by using gamma voltages (gray level voltage) supplied from a gamma voltage generator, and respectively outputs the data voltages to the data lines (DL1 to DLd).

The data driver 300 shifts the source start pulse SSP transmitted from the timing controller 400 by the source shift clock SSC to generate a sampling signal. The data driver 300 latches the image data, which is inputted by the source shift clock SSC, by the sampling signal. The data driver 300 converts the image data into the data voltages. Then, the data driver 300 respectively supplies the data voltages to the data lines in units of a horizontal line of pixels P in response to a source output enable signal SOE. The horizontal line of pixels P may be referred as the horizontal line. In other words, the horizontal line of pixels P is arranged in the horizontal direction.

To this end, the data driver 300 may include a shift register, a latch, a digital-to-analog converter (DAC), and an output buffer.

The shift register outputs the sampling signal by using data control signals DCS received from the timing controller 400.

The latch latches the digital image data which are sequentially received from the timing controller 400, and then simultaneously outputs the latched image data to the DAC.

The DAC converts the image data, transmitted from the latch, into positive or negative data voltages, and outputs the data voltages. That is, the DAC converts the image data into the positive or negative data voltages by using the gamma voltages supplied from the gamma voltage generator and respectively outputs the positive or negative data voltages to the data lines according to the polarity control signal POL transmitted from the timing controller 400.

The output buffer respectively outputs the positive or negative data voltages transmitted from the DAC, to the data lines (DL1 to DLd) of the panel 100 by the source output enable signal SOE transmitted from the timing controller 400.

Fourth, the gate driver 200 may shift the gate start pulse GSP transmitted from the timing controller 400 by the gate shift clock GSC to sequentially supply a scan pulse having a gate-on voltage Von to the gate lines (GL1 to GLg). Also, the gate driver 200 may supply a gate-off voltage Voff to the gate lines (GL1 to GLg) during the rest period where the scan pulse having the gate-on voltage Von is not supplied.

The number of gate lines (GL1 to GLg) 210 connected to the gate driver 200 may be determined by the number of horizontal lines of the pixels P which are provided in the panel 100. That is, only one the gate line 210 is illustrated as being provided in the panel 100 of FIGS. 2 and 3, but gate lines 210 equal to the number of the horizontal lines may be provided in the panel 100.

In the above description, it has been described that the data driver 300, the gate driver 200, and the timing controller 400 are separately provided. However, the data driver 300 and/or the gate driver 200 may be integrated into the timing controller 400.

Fifth, the touch panel 500 is configured with the self-capacitance electrodes 510, and two or more self-capacitance electrodes 510 may constitute one touch group 530.

The self-capacitance electrodes 510, as described above, may function as the common electrodes. For example, a common voltage Vcom may be supplied to the self-capacitance electrodes 510 during the displaying period, and during the touch sensing period, the plurality of touch sensing signals respectively generated from the self-capacitance electrodes 510 may be transmitted to the touch sensing unit 600.

The touch panel 500 according to an embodiment of the present invention may be provided in the self-capacitance type. The self-capacitance type does not include two different types of touch lines such as the driving lines and the receiving lines but only include only one type of touch lines 52. Therefore, the touch sensing algorithm of the self-capacitance type is different from the mutual-capacitance type.

In this case, the self-capacitance electrodes 510 may be connected to the touch sensing unit 600 through the respective touch lines (TL1 to TLn) 520 in a one-to-one correspondence relationship. That is, as illustrated in FIG. 3, the touch lines 520 that connect the self-capacitance electrodes 510 to the touch sensing unit 600 may be arranged along the gate line 210. Thus, a parasitic capacitance which is generated between the data line DL and the touch line 520 may be reduced.

However, the present invention is not limited thereto. For example, the touch lines 520 may be arranged in parallel with a data line perpendicular to the gate line 210. In the present invention, the term "perpendicular" is not limited to intersection at exact 90 magnitudes and it can be broadly interpreted as substantially vertical.

Two or more self-capacitance electrodes 510 may constitute one touch group 530. That is, the two or more self-capacitance electrodes 510 may be included in the one touch group 530. In FIG. 3, the touch group 530 comprising eighteen self-capacitance electrodes 510 is illustrated as an example of the touch group 530 according to an embodiment of the present invention. Also, in FIG. 3, the touch panel 500 including the three touch groups (1TG to 3TG) is illustrated as an example of the touch panel 500 according to an embodiment of the present invention.

Moreover, as illustrated in FIG. 3, each of the three touch groups (1TG to 3TG) may be arranged along with the gate lines 210.

Moreover, as illustrated in FIG. 3, the touch groups 530 are positioned in series along the vertical direction of the panel 100. Therefore, a gate line is extended through only one touch group 530 of the panel 100.

For example, when the gate lines 210 are extended in a direction from a left side to a right side of the panel 100, one touch group 530 may be extended from the left side to the right side of the panel 100.

Sixth, by using the touch sensing signals respectively received from the self-capacitance electrodes 510, the touch sensing unit 600 may determine a touch event of the touch panel 500.

For example, the displaying periods where an image is displayed and the touch sensing periods may be alternately provided in the one frame period, and by using a plurality of touch sensing signals which are respectively received from a plurality of self-capacitance electrodes 510 constituting one touch group 530 during the touch sensing period, the touch sensing unit 600 may determine a touch event on the self-capacitance electrodes 510 constituting the one touch group 530.

Figure 5:
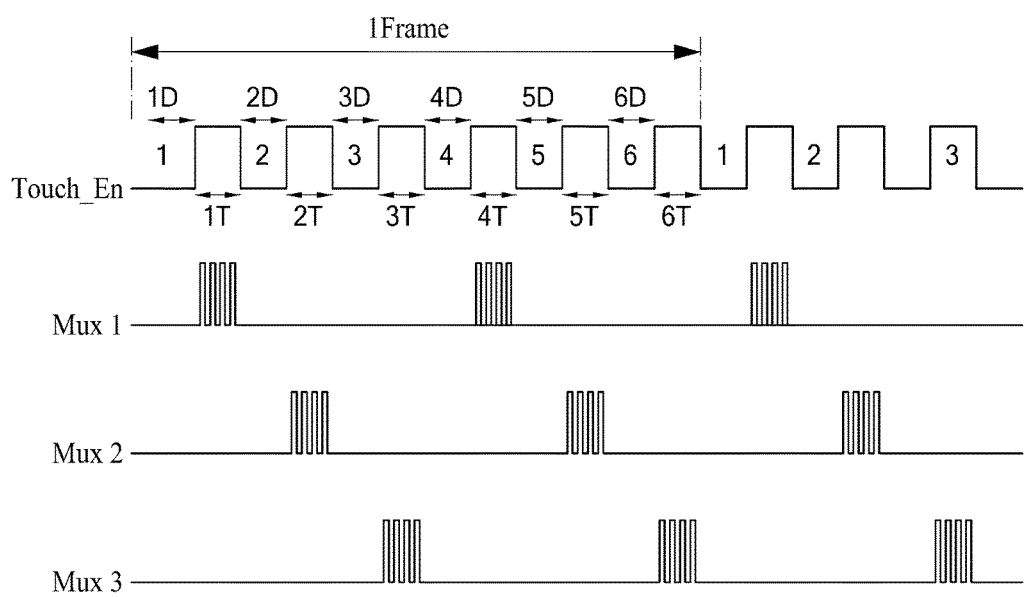
FIG. 5 is an exemplary diagram showing waveforms of a touch control signal and a touch driving signal applied to a display device according to an embodiment of the present invention.

As illustrated in FIGS. 2 and 3, the touch sensing unit 600 may include a plurality of multiplexers (MUX1 to MUX3). Each of the multiplexers 610 simultaneously supply a touch driving signal to the self-capacitance electrodes 510 constituting the one touch group 530. The touch lines 520 associated with each of the multiplexers 610 transmit the touch driving signal to each of the self-capacitance electrodes 510 simultaneously. For example, the touch driving signal may be the high level portion of (Mux1 to Mux3) pulses when touch control signal Touch_En is high as illustrated in FIG. 5. During the high level portion, the self-capacitance is charged at the self-capacitance electrodes 510. Also, by using the touch sensing signals which are respectively induced from the self-capacitance electrodes by the touch driving signal. For example, the touch sensing signals may be the low level portion of (Mux1 to Mux3) pulses when touch control signal Touch_En is low as illustrated in FIG. 5. During the low level portion, the charged self-capacitance is transmitted to the multiplexers 610 through the touch line 520. The touch sensing unit 600 comprising multiplexers 610 may determine a touch event on the self-capacitance electrodes 510.

That is, as illustrated in FIG. 5, (Mux1 to Mux3) signals comprising a plurality of pulses where the high level of the pulses represent the touch driving signal and the low level of the pulses represent the touch sensing signal.

That is, in the present invention, for example, each of the multiplexers 610 may perform a function of supplying a touch driving signal. Consequently, the touch sensing unit 600 determines a touch event. Particularly, in FIG. 3, the three touch groups (1TG to 3TG) and the three multiplexers (MUX1 to MUX3) respectively connected to the touch groups are illustrated. In other words, each of touch groups is coupled with at least one corresponding multiplexer. In addition, the touch lines of the each touch groups are arranged along the gate line. In addition, the touch lines of the each touch groups are connected to the corresponding multiplexer. In addition, the touch sensing unit comprising a plurality of multiplexers.

In this case, during the displaying period where an image is displayed, the common voltage Vcom may be supplied to the touch group 530 corresponding to the gate lines 210 through which the scan pulse is supplied, and during the touch sensing period, by using a plurality of touch sensing signals which are respectively received from a plurality of self-capacitance electrodes 510 constituting one of the touch groups 530, the touch sensing unit 600 may determine a touch event on the self-capacitance electrodes 510 constituting the one touch groups 530.

To this end, the common voltage Vcom may be supplied by the multiplexer 610 included in the touch sensing unit 600. The multiplexer 610 may supply the common voltage Vcom to the self-capacitance electrodes 510 during the displaying period. Also, during the touch sensing period, by receiving the touch sensing signals which are respectively received from the self-capacitance electrodes 510 driving signal, the touch sensing unit 600 comprising multiplexer 610 may determine a touch event. Moreover, in order for the common voltage Vcom to be supplied to the self-capacitance electrodes 510 during the displaying period and not to be supplied to the self-capacitance electrodes 510 during the touch sensing period, the multiplexer may include a plurality of switches. That is, during the displaying period, the switches may be switched on by the touch control signal Touch_En and may supply the common voltage Vcom to the self-capacitance electrodes 510.

The touch sensing unit 600 may compensate for the touch sensing signals by using compensation data.

For example, during the displaying period before the following touch sensing period, the touch sensing unit 600 is configured to receive the image data from the timing controller 400. During the following touch sensing period, the touch sensing unit 600 may use the image data and a plurality of touch sensing signals received from the touch group 530 to determine a touch event on the self-capacitance electrodes 510 constituting the touch group 530.

For example, touch raw data (i.e., a level of a touch sensing signal) is largely shifted by a capacitance change of the liquid crystal disposed in the pixel P, causing DTX. For this reason, due to the DTX, an error occurs in determining a touch event. The capacitance change of the liquid crystal is varied on the basis of the level of the data voltage applied to the pixel electrode of the pixel P.

Particularly, when an image is changed from a black image ($0^{th}$ Gray level) which is referred as the lowest gray level (e.g. 8-bit image format) to a white image ($255^{th}$ Gray level) which is referred as the highest gray level, a capacitance change of the liquid crystal from the black pattern to the white pattern is large, and for this reason, there is a high probability that DTX occurs.

To solve or address such problems, in an embodiment of the present invention, by using image data, supplied to pixels corresponding to a touch group, as the compensation data, the touch sensing unit 600 may determine a touch event on the touch group.

Moreover, in the present embodiment, since the touch lines 520 are arranged along with the gate lines 210. Also the touch lines 520 of the touch groups 530 and disposed perpendicular to the data lines (DL1 to DLd). Hence parasitic capacitances which are generated between the data lines and the touch lines 520 are reduced. Accordingly, the sensing performance of the touch sensing unit 600 can be improved.

The touch sensing unit 600 may be provided independently from the data driver 300 as illustrated in FIGS. 2 and 3, but is not limited thereto. In some embodiments, the touch sensing unit 600 may be integrated within the data driver 300. In this case, the touch lines 520 may be connected to the touch sensing unit 600 within the data driver 300, which is disposed at an upper end or a lower end of the panel 100, through a non-display area which is provided on a left side or a right side of the panel 100. However, as described above, the touch lines 520 may be arranged along with the data lines, and thus, when the touch sensing unit 600 is provided in the data driver 300, the touch lines 520 may be directly connected to the touch sensing unit 600. Nevertheless, the touch groups 530 are arranged along the gate line 210.

Hereinafter, a method of driving a display device according to an embodiment of the present invention will be described in detail with reference to FIGS. 2 to 5.

Figure 4:
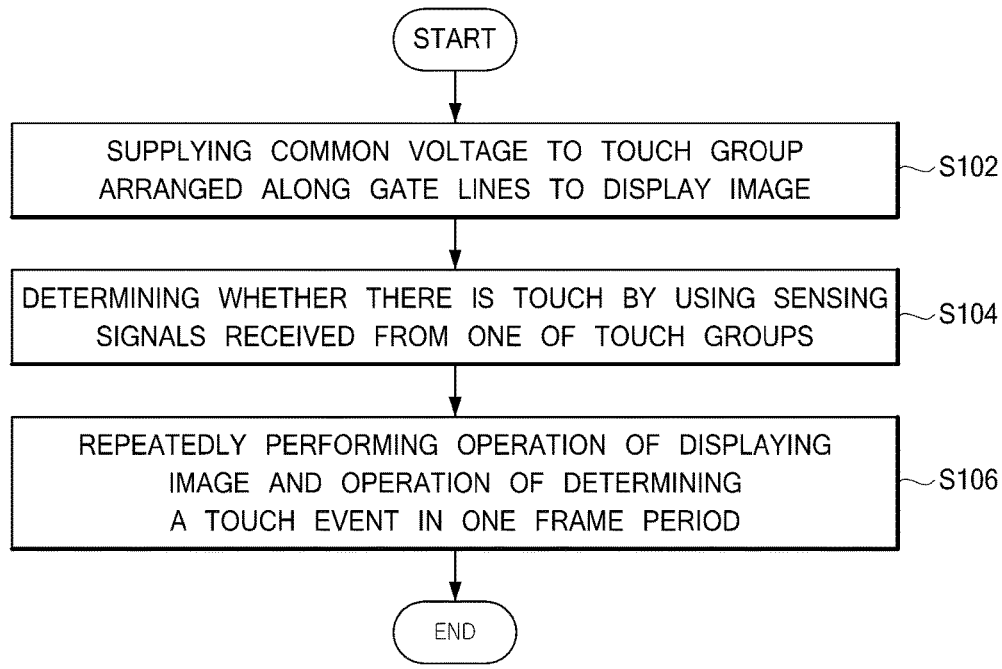
FIG. 4 is a flowchart of a method of driving a display device according to an embodiment of the present invention.

FIG. 4 is a flowchart of a method of driving a display device according to an embodiment of the present invention, and FIG. 5 is an exemplary diagram showing waveforms of a touch control signal Touch_En supplied to the touch sensing unit and a touch driving signal supplied to a display device according to an embodiment of the present invention. In the following description, details which are the same as or similar to the above-described details are not described or will be briefly described. Also, in the following description, as illustrated in FIG. 3, a case where each of the touch groups 530 and each of the multiplexers 610 are provided as three will be described as an example.

The method of driving the display device according to an embodiment of the present invention, as illustrated in FIG. 4, may include: operation S102 that, when one of a plurality of displaying periods included in one frame period commences, sequentially supplies the scan pulse to the gate lines 210 which are arranged in a first direction of the panel 100, supplies the common voltage Vcom to an $n^{th}$ touch group, corresponding to a plurality of gate lines to which the scan pulse is supplied, among the touch groups 530 which are arranged in the first direction, and displays an image on a plurality of pixels corresponding to the plurality of gate lines to which the scan pulse is supplied; operation S104 that, when one of a plurality of touch sensing periods included in the one frame period commences, analyzes a plurality of touch sensing signals received from an $m^{th}$ touch group of the touch groups 530 to determine a touch event on a plurality of self-capacitance electrodes 510 configuring the $m^{th}$ touch group 530; and operation S106 that, in the one frame period, repeatedly performs an operation of displaying the image and an operation of determining a touch event.

Here, when the panel 100 is configured as illustrated in FIGS. 2 and 3, the first direction may be a horizontal direction of the panel 100.

In operation S102 of displaying the image, while the common voltage is being supplied to the $n^{th}$ touch group 530, the scan pulse may be sequentially supplied to the plurality of gate lines corresponding to the $n^{th}$ touch group 530, and thus, an image may be displayed on a plurality of pixels corresponding to some gate lines to which the scan pulse is supplied.

In this case, the common voltage may be supplied to all the self-capacitance electrodes 510 configuring the touch groups 530, or may be supplied to only a plurality of self-capacitance electrodes configuring a touch group corresponding to a plurality of gate lines to which the scan pulse is supplied.

Moreover, in operation S102 of displaying the image, while the scan pulse is being sequentially supplied to the gate lines 210, image data may be supplied to a plurality of data lines arranged perpendicular to the gate lines 210 to display an image. Since the touch groups 530 are arranged along with the gate lines 210 and the data lines are arranged perpendicular to the gate lines 210, the touch groups 530 and the touch lines 520 may be arranged perpendicular to the data lines. Therefore, parasitic capacitances which are generated between the touch lines 520 and the data lines are reduced, and thus, a touch sensitivity of the touch sensing unit 600 is enhanced.

In operation S104 of determining a touch event, by using image data which are supplied to a plurality of pixels corresponding to the $m^{th}$ touch group during an displaying period before the following touch sensing period determining a touch event on the $m^{th}$ touch group 530 and a plurality of touch sensing signals which are received from the $m^{th}$ touch group during the touch sensing period, the touch sensing unit 600 may determine a touch event on the self-capacitance electrodes configuring the $m^{th}$ touch group.

As described above, a level and a sensitivity of each of the touch sensing signals is affected by a pattern of the image which is displayed by the panel 100 during the displaying period. Therefore, in the present embodiment, the touch sensing unit 600 may determine a touch event by using the compensation data which is generated during the displaying period before the following touch sensing period on the basis of the image data which are supplied to the pixels corresponding to the touch group 530.

Operation S102 of displaying the image and operation 104 of determining a touch event may be repeatedly performed until the scan pulse is supplied to all the gate lines which are provided in the panel 100.

For example, FIG. 5 is an exemplary diagram showing waveforms of the touch control signal and the touch driving signal applied to the panel 100 illustrated in FIG. 3. In FIG. 5, a time period referred to by D indicates the displaying period, and a time period referred to by T indicates the touch sensing period. That is, the X-axis of the Touch_En waveform is a time domain and the Y-axis of the Touch_En waveform indicates whether the touch sensing period is active or inactive. For example, high level of Touch_En activates the touch sensing period and low level of Touch_En activates the displaying period. Also, a signal referred to by Touch_En is the touch control signal, and a signal referred to by Mux is the touch driving signal and the touch sensing signal. That is, the X-axis of the (Mux1 to Mux3) waveforms a time domain and the Y-axis of the (Mux1 to Mux3) waveforms indicate the touch driving signal and the touch sensing signal. For example, during the 1T period of the Touch_En waveform, the Mux1 waveform sequentially generates a plurality of pulses. In this case, the high level portion of the plurality of pluses may be the touch driving signal which charges self-capacitance of the plurality of self-capacitance electrodes 510 of the touch group 1TG. The low level portion of the plurality of pluses may be the touch sensing signal which discharges the charged self-capacitance of the plurality of self-capacitance electrodes 510 of the touch group 1TG. During the 2T period of the Touch_En waveform, the Mux2 waveform sequentially generates a plurality of pluses. In this case, the touch driving signal and the touch sensing signal is supplied to the plurality of self-capacitance electrodes 510 of the touch group 2TG. During the 3T period of the Touch_En waveform, the Mux3 waveform sequentially generates a plurality of pluses. In this case, the touch driving signal and the touch sensing signal is supplied to the plurality of self-capacitance electrodes 510 of the touch group 3TG.

That is, when the three touch groups (1TG to 3TG) are provided in the panel 100 as illustrated in FIG. 3, six displaying periods (1D to 6D) and six touch sensing periods (1T to 6T) may be repeatedly performed in one frame period as illustrated in FIG. 5, for determining a touch event of the panel 100 while displaying an image in the panel 100.

Hereinafter, a method of driving a display device according to an embodiment of the present invention will be described in detail with reference to FIGS. 2 to 6.

Figure 6:
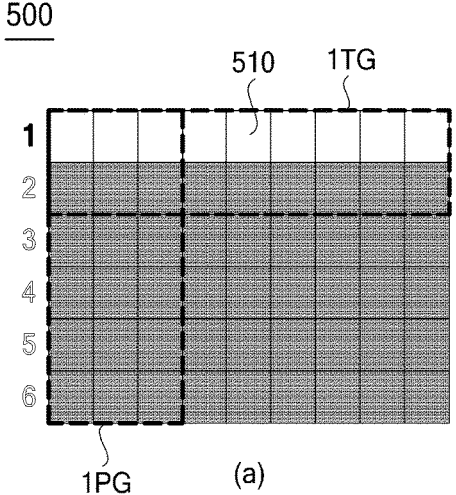
FIG. 6 is an exemplary diagram for describing an operation of determining a touch event, in a method of driving a display device according to an embodiment of the present invention.
Figure 6:
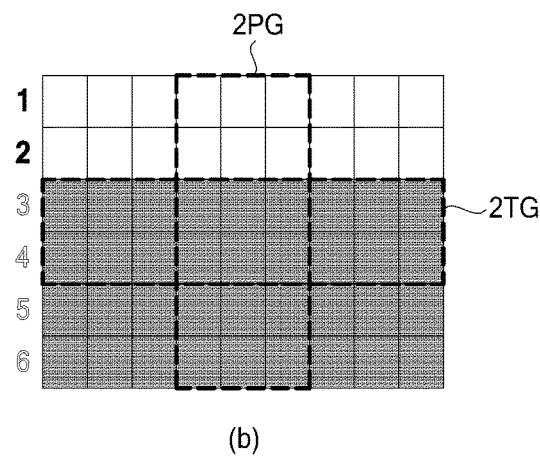
Figure 6:
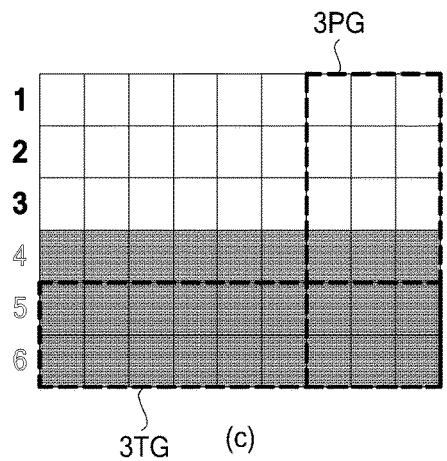
Figure 6:
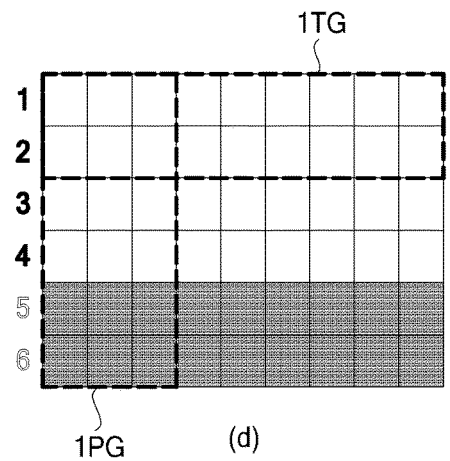
Figure 6:
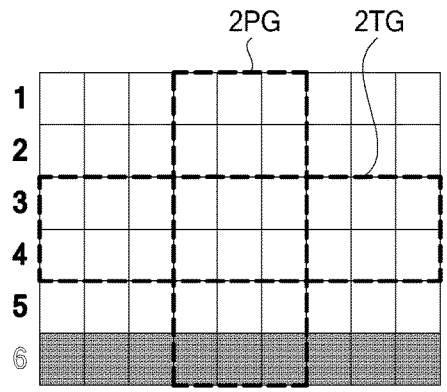
Figure 6:
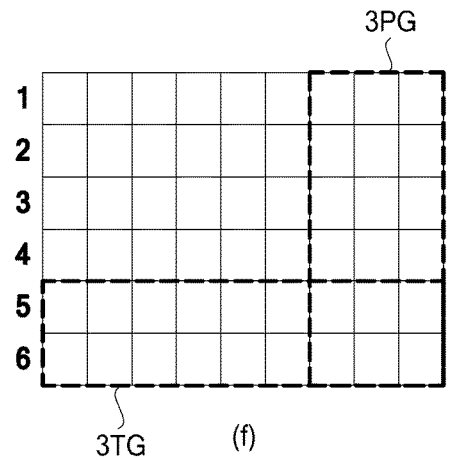

FIG. 6 is an exemplary diagram for describing an operation of determining a touch event, in a method of driving a display device according to an embodiment of the present invention, and illustrates a method of determining a touch event when an image is changed from black to white, in the method of driving the display device according to an embodiment of the present invention. Hereinafter, the method of driving the display device according to an embodiment of the present invention will be described by using the panel 100 of FIG. 3 and the signals illustrated in FIG. 5. In this case, as illustrated in FIG. 3, a plurality of self-capacitance electrodes 510 constituting one touch group 530 may be divided into two subgroups in a direction perpendicular to the gate line 210, and a plurality of pixels P corresponding to the two subgroups may display an image during two different displaying periods. Also, in FIG. 6, (1PG to 3PG) respectively indicate touch groups where a touch event is determined by a related art method of driving a display device.

As described above, FIG. 6 illustrates an image refreshing sequence of the panel 100 when the image is refreshed from black to white during one frame period. It is assumed that during the frame previous to the current frame (hereinafter simply referred to as the previous frame) a full black image was displayed on all the pixels of the panel 100. Also it should be noted that, black to white change is only for describing an extreme DTX example and the present invention is not limited thereto.

First, referring to FIG. 6 (a), the scan pulse may be sequentially supplied to a plurality of gate lines corresponding to a first subgroup (illustrated as a number "1" in FIG. 6) constituting a portion of the first touch group 1TG during a first displaying period 1D among the six displaying periods illustrated in FIG. 5. The first subgroup 1 is refreshed from a black image which was displayed in the previous frame to a white image which is refreshed in the current frame, by supplying a scan pulse to the gate lines with supplying a data voltage level representing the white image to the data lines.

During the displaying period, a common voltage may be only supplied to the corresponding touch group, or may be supplied to all the touch groups (1TG to 3TG).

Second, during the first touch sensing period 1T among the six touch sensing periods illustrated in FIG. 5, which is followed by the first displaying period 1D, the touch sensing signal of the first touch group 1TG may be sensed.

In this case, the image corresponding to the first subgroup 1 is refreshed from a black image to a white image but the remaining subgroups (2 to 6) have not been refreshed yet. Therefore, during the first displaying period 1D, before the beginning of the first touch sensing period 1T, the first subgroup 1 displays the refreshed image and the rest of the subgroups (2 to 6) still display the unrefreshed image.

A touch sensing unit 600 comprising a plurality of multiplexers, a first multiplexer Mux1 may receive a touch sensing signal, during the first touch sensing period 1T, from the first touch group 1TG which comprising the subgroups (1 to 2). A touch sensing unit 600 may compensate DTX within the first touch group 1TG based on a refreshed image data and an unrefreshed image data as a compensation data to determine a touch event. For example, during the first touch sensing period 1T, the first subgroup 1 is regarded as the refreshed image data (e.g. white image data) and the second subgroup 2 is regarded as the unrefreshed image data (e.g. black image data).

In addition, DTX is occurred at the first subgroup 1 because of the refreshed image. No such DTX is occurred at the second subgroup 2 because of the unrefreshed image. Consequently, the first subgroup 1 may suffer from DTX and the second subgroup 2 may not suffer from DTX. So during the touch sensing period 1T, compensation for the first subgroup 1 is needed and compensation for the second subgroup 2 may not be needed.

Third, referring to FIG. 6 (*b*), the scan pulse may be sequentially supplied to a plurality of gate lines corresponding to a second subgroup (illustrated as a number "2" in FIG. 6) constituting the other portion of the first touch group 1TG during a second displaying period 2D among the six displaying periods illustrated in FIG. 5. The second subgroup 2 is refreshed from a black image which was displayed in the previous frame to a white image which is refreshed in the current frame, by supplying a scan pulse to the gate lines with supplying a data voltage level representing the white image to the data lines.

Fourth, during the second touch sensing period 2T among the six touch sensing periods illustrated in FIG. 5, which is followed by the second displaying period 2D, the touch sensing signal of the second touch group 2TG may be sensed.

In this case, the image corresponding to the second subgroup 2 is refreshed from a black image to a white image but the remaining subgroups (3 to 6) have not been refreshed yet. Therefore, during the second displaying period 2D, before the beginning of the second touch sensing period 2T, the subgroups (1 to 2) display the refreshed image and the rest of the subgroups (3 to 6) still display the unrefreshed image.

A touch sensing unit 600 comprising a plurality of multiplexers, a second multiplexer Mux2 may receive a touch sensing signal during the second touch sensing period 2T, from the second touch group 2TG which comprising the subgroups (3 to 4). A touch sensing unit 600 may compensates DTX within the second touch group 2TG based on a refreshed image data and an unrefreshed image data as a compensation data to determine a touch event. For example, during the second touch sensing period 2T, the third subgroup 3 is regarded as the unrefreshed image data (e.g. black image data) and the fourth subgroup 4 is regarded as the unrefreshed image data (e.g. black image data).

In addition, no such DTX is occurred at the third subgroup 3 because of the unrefreshed image. No such DTX is occurred at the fourth subgroup 4 because of the unrefreshed image. Consequently, the subgroups (3 to 4) may not suffer from DTX. So during the touch sensing period 2T, compensation for the subgroups (3 to 4) may not be needed.

Fifth, referring to FIG. 6 (*c*), the scan pulse may be sequentially supplied to a plurality of gate lines corresponding to a third subgroup (illustrated as a number "3" in FIG. 6) constituting a portion of the second touch group 2TG during a third displaying period 3D among the six displaying periods illustrated in FIG. 5. The third subgroup 3 is refreshed from a black image which was displayed in the previous frame to a white image which is refreshed in the current frame, by supplying a scan pulse to the gate lines with supplying a data voltage level representing the white image to the data lines.

Sixth, during the third touch sensing period 3T among the six touch sensing periods illustrated in FIG. 5, which is followed by the third displaying period 3D, the touch sensing signal of the third touch group 3TG may be sensed.

In this case, the image corresponding to the third subgroup 3 is refreshed from a black image to a white image but the remaining subgroups (4 to 6) have not been refreshed yet. Therefore, during the third displaying period 3D, before the beginning of the third touch sensing period 3T, the subgroups (1 to 3) display the refreshed image and the rest of the subgroups (4 to 6) still display the unrefreshed image.

A touch sensing unit 600 comprising a plurality of multiplexers, a third multiplexer Mux3 may receive a touch sensing signal during the third touch sensing period 3T, from the third touch group 3TG which comprising the subgroups (5 to 6). A touch sensing unit 600 may compensates DTX within the third touch group 3TG based on a refreshed image data and an unrefreshed image data as a compensation data to determine a touch event. For example, during the third touch sensing period 3T, the fifth subgroup 5 is regarded as the unrefreshed image data (e.g. black image data) and the sixth subgroup 6 is regarded as the unrefreshed image data (e.g. black image data).

In addition, no such DTX is occurred at the fifth subgroup 5 because of the unrefreshed image. No such DTX is occurred at the sixth subgroup 6 because of the unrefreshed image. Consequently, the subgroups (5 to 6) may not suffer from DTX. So during the touch sensing period 3T, compensation for the subgroups (5 to 6) may not be needed.

Seventh, referring to FIG. 6 (*d*), the scan pulse may be sequentially supplied to a plurality of gate lines corresponding to a fourth subgroup (illustrated as a number "4" in FIG. 6) constituting the other portion of the second touch group 2TG during a fourth displaying period 4D among the six displaying periods illustrated in FIG. 5. The fourth subgroup 4 is refreshed from a black image which was displayed in the previous frame to a white image which is refreshed in the current frame, by supplying a scan pulse to the gate lines with supplying a data voltage level representing the white image to the data lines.

Eighth, during the fourth touch sensing period 4T among the six touch sensing periods illustrated in FIG. 5, which is followed by the fourth displaying period 4D, the touch sensing signal of the first touch group 1TG may be sensed again.

In this case, the image corresponding to the fourth subgroup 4 is refreshed from a black image to a white image but the remaining subgroups (5 to 6) have not been refreshed yet. Therefore, during the fourth displaying period 4D, before the beginning of the fourth touch sensing period 4T, the subgroups (1 to 4) display the refreshed image and the rest of the subgroups (5 to 6) still display the unrefreshed image.

A touch sensing unit 600 comprising a plurality of multiplexers, the first multiplexer Mux1 may receive a touch sensing signal during the fourth touch sensing period 4T, from the first touch group 1TG which comprising the subgroups (1 to 2). A touch sensing unit 600 may compensates DTX within the first touch group 1TG based on a refreshed image data and an unrefreshed image data as a compensation data to determine a touch event. For example, during the fourth touch sensing period 4T, the first subgroup 1 is regarded as the refreshed image data (e.g. white image data) and the second subgroup 2 is regarded as the refreshed image data (e.g. white image data).

In addition, DTX is occurred at the first subgroup 1 because of the refreshed image. DTX is occurred at the second subgroup 2 because of the refreshed image. Consequently, the subgroups (1 to 2) may suffer from DTX and compensation for the subgroups (1 to 2) may be needed.

Ninth, referring to FIG. 6 (*e*), the scan pulse may be sequentially supplied to a plurality of gate lines corresponding to a fifth subgroup (illustrated as a number "5" in FIG.

6) constituting a portion of the third touch group 3TG during a fifth displaying period 5D among the six displaying periods illustrated in FIG. 5. The fifth subgroup 5 is refreshed from a black image which was displayed in the previous frame to a white image which is refreshed in the current frame, by supplying a scan pulse to the gate lines with supplying a data voltage level representing the white image to the data lines.

Tenth, during the fifth touch sensing period 5T among the six touch sensing periods illustrated in FIG. 5, which is followed by the fifth displaying period 5D, the touch sensing signal of the second touch group 2TG may be sensed again.

In this case, the image corresponding to the fifth subgroup 5 is refreshed from a black image to a white image but the remaining sixth subgroup 6 has not been refreshed yet. Therefore, during the fifth displaying period 5D, before the beginning of the fifth touch sensing period 5T, the subgroups (1 to 5) display the refreshed image and the sixth subgroup 6 still display the unrefreshed image.

A touch sensing unit 600 comprising a plurality of multiplexers, the second multiplexer Mux2 may receive a touch sensing signal during the fifth touch sensing period 5T, from the second touch group 2TG which comprising the subgroups (3 to 4). A touch sensing unit 600 may compensates DTX within the second touch group 2TG based on a refreshed image data and an unrefreshed image data as a compensation data to determine a touch event. For example, during the fifth touch sensing period 5T, the third subgroup 3 is regarded as the refreshed image data (e.g. white image data) and the fourth subgroup 4 is regarded as the refreshed image data (e.g. white image data).

In addition, DTX is occurred at the third subgroup 3 because of the refreshed image. DTX is occurred at the fourth subgroup 4 because of the refreshed image. Consequently, the subgroups (3 to 4) may suffer from DTX and compensation for the subgroups (3 to 4) may be needed.

Eleventh, referring to FIG. 6 (*f*), the scan pulse may be sequentially supplied to a plurality of gate lines corresponding to a sixth subgroup (illustrated as a number "6" in FIG. 6) constituting the other portion of the third touch group 3TG during a sixth displaying period 6D among the six displaying periods illustrated in FIG. 5. The sixth subgroup 6 is refreshed from a black image which was displayed in the previous frame to a white image which is refreshed in the current frame, by supplying a scan pulse to the gate lines with supplying a data voltage level representing the white image to the data lines.

Twelfth, during the sixth touch sensing period 6T among the six touch sensing periods illustrated in FIG. 5, which is followed by the sixth displaying period 6D, the touch sensing signal of the third touch group 3TG may be sensed again.

In this case, the image corresponding to the sixth subgroup 6 is refreshed from a black image to a white image so all the subgroups (1 to 6) have been refreshed. Therefore, during the sixth displaying period 6D, before the beginning of the sixth touch sensing period 6T, the subgroups (1 to 6) display the refreshed image.

A touch sensing unit 600 comprising a plurality of multiplexers, the third multiplexer Mux3 may receive a touch sensing signal during the sixth touch sensing period 6T, from the third touch group 3TG which comprising the subgroups (5 to 6). A touch sensing unit 600 may compensates DTX within the third touch group 3TG based on a refreshed image data and an unrefreshed image data as a compensation data to determine a touch event. For example, during the sixth touch sensing period 6T, the fifth subgroup 5 is regarded as the refreshed image data (e.g. white image data) and the sixth subgroup 6 is regarded as the refreshed image data (e.g. white image data).

In addition, DTX is occurred at the fifth subgroup 5 because of the refreshed image. DTX is occurred at the sixth subgroup 6 because of the refreshed image. Consequently, the subgroups (5 to 6) may suffer from DTX and compensation for the subgroups (5 to 6) may be needed.

Figure 7:
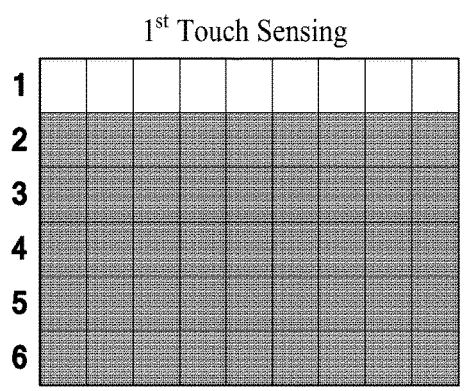
FIG. 7 is an exemplary diagram for comparing compensation data, applied to a method of driving a display device according to an embodiment of the present invention, and compensation data applied to a related art method of driving a display device.
Figure 7:
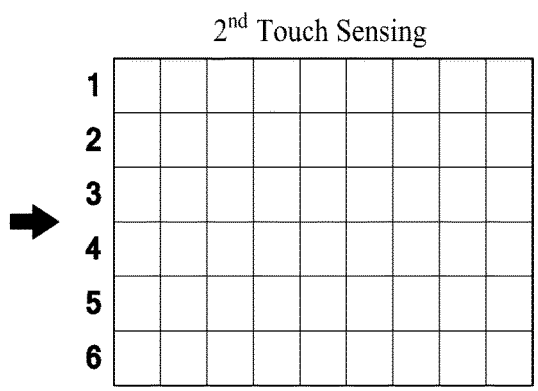
Figure 7:
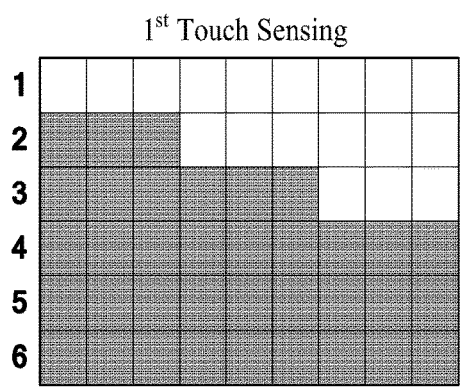
Figure 7:
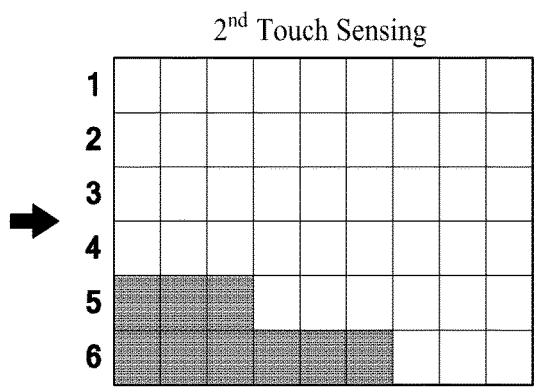

FIG. 7 is an exemplary diagram for comparing compensation data, applied to a method of driving a display device according to an embodiment of the present invention, and compensation data applied to a related art method of driving a display device, and illustrates the compensation data applied to the method of driving the display device according to an embodiment of the present invention and the compensation data applied to the related art method of driving the display device when an exemplary image is refreshed from black to white.

Referring to the details described above with reference to FIG. 6 (*a*) to (*c*), the method of driving the display device according to an embodiment of the present invention may use compensation data illustrated on the left of FIG. 7 (*a*), for first touch sensing of the touch panel 500.

The first touch sensing may denote the first to third touch sensing periods (1T to 3T).

In this case, during the first touch sensing period 1T, a touch event may be determined with DTX compensation on the basis of the image data, in view of a refreshed portion (e.g. white image area) and an unrefreshed portion (e.g. black image area). However, during the second and third touch sensing periods (2T and 3T), a touch event may be determined with DTX compensation on the basis of the image data, only considering the unrefreshed portion (e.g. black image).

That is, by implementing an embodiment of the present invention, the DTX compensation data can be simpler in terms of complexity. In other words, the complexity of the DTX compensation calculation can be reduced with a plurality of touch groups arranged along a gate line with an arrangement of the corresponding multiplexers for supplying touch sensing signal and touch driving signal to the corresponding touch groups.

Referring to the details described above with reference to FIG. 6 (*d*) to (*f*), the method of driving the display device according to an embodiment of the present invention may use compensation data illustrated on the right of FIG. 7 (*a*), for second touch sensing of the touch panel 500.

The second touch sensing may denote the fourth to sixth touch sensing periods (4T to 6T).

In this case, during the fourth to sixth touch sensing periods (4T to 6T), a touch event may be determined with DTX compensation on the basis of the image data, in view of a refreshed portion (e.g. white image) only.

That is, by implementing one or more embodiments of the present invention, the DTX compensation data can be simpler in terms of complexity. In other words, the complexity of the DTX compensation calculation can be reduced.

Particularly, the embodiments of the present invention can be effective when the panel 100 size is increased. In other words, when the panel size is increased, more self-capacitance electrodes are required, more touch groups are required, and a larger size of the memory is required. For example, an embodiment of the present invention is preferred when the panel size is above 7 inch diagonal size but the present invention is not limited thereto.

FIG. 7 (*b*) illustrates compensation data applied to first touch sensing and second touch sensing in the related art method of driving the display device, and illustrates the compensation data generated with reference to the areas respectively referred to by (1PG to 3PG) in FIG. 6.

To provide an additional description, as illustrated in FIG. 7 (*b*), the related art method of driving the display device uses image data having a complicated structure as the compensation data. Therefore, in the related art, complicated calculation formulas are used to determine a touch event, and for this reason, a number of errors occur in determining a touch event.

However, as illustrated in FIG. 7 (*a*), the method of driving the display device according to an embodiment of the present invention uses a simple compensation data structure. Therefore, a touch event is determined by a simpler calculation formula, and thus, an error which occurs in determining a touch event is reduced.

Figure 8:
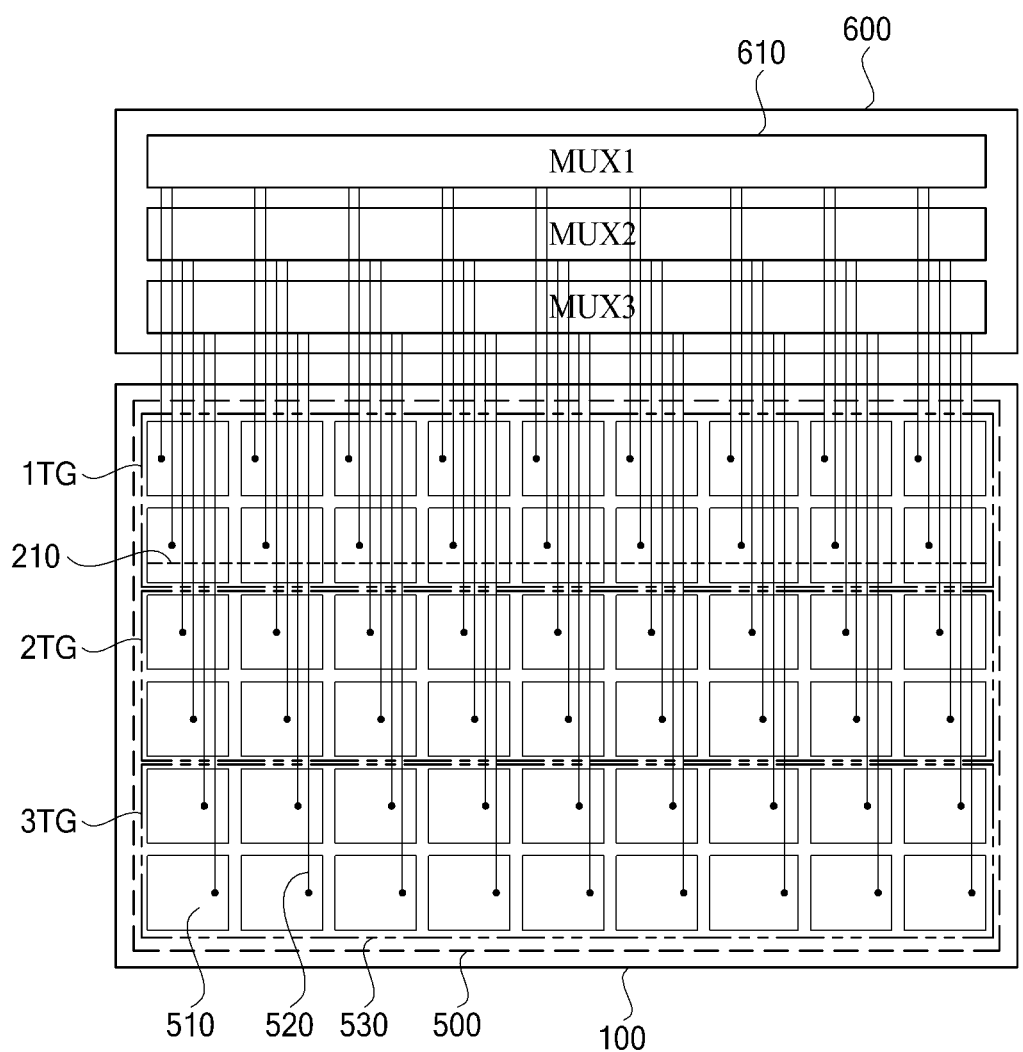
FIG. 8 is another exemplary diagram illustrating configurations of a panel and a touch sensing unit applied to a display device according to an embodiment of the present invention.

FIG. 8 is another exemplary diagram illustrating configurations of a panel and a touch sensing unit applied to a display device according to an embodiment of the present invention, and illustrates a panel 100 including three touch groups (1TG to 3TG) and a touch sensing unit 600 comprising three multiplexers (MUX1 to MUX3).

Except that the touch lines 520 are arranged along with the data lines which are arranged perpendicular to the gate lines 210 and the touch sensing unit 600 is provided on an upper end of the panel 100 instead of a left side or a right side of the panel 100, configurations and functions of the panel 100 and the touch sensing unit 600 illustrated in FIG. 8 are the same as (or similar to) those of the panel 100 and the touch sensing unit 600 illustrated in FIG. 3.

Particularly, as illustrated in FIG. 8, when the touch lines 520 are arranged along with the data lines, the touch sensing unit 600 may be provided in the data driver 300.

According to the embodiments of the present invention, since a touch event is determined by using the touch groups which are arranged along with the gate lines, a size of a memory which stores data necessary for touch determination is reduced, and an error which occurs in determining a touch event is reduced.

Moreover, according to the embodiments of the present invention, DTX where a level of touch raw data is changed due to a capacitance change of liquid crystal is reduced, and thus, a performance of determining a touch event is enhanced. That is, according to the embodiments of the present invention, an accuracy of touch determination, sensitivity, and linearity are enhanced.

The features of the embodiments may be also described as follows.

The apparatus according to the present invention includes: an array of pixels (P) configured to provide images on a frame-by-frame basis, each frame comprises a plurality of displaying periods (1D, 2D, 3D, 4D, 5D, 6D) and a plurality of touch sensing periods (1T, 2T, 3T, 4T, 5T, 6T) which are alternately arranged in sequence; and an array of self-capacitance electrodes (510) that are grouped into a plurality of touch groups (1TG, 2TG, 3TG) in a horizontal scan direction with each touch group connected to a single multiplexer (610) among a plurality of multiplexers such that all of the self-capacitance electrodes (510) provide touch sensing signals to corresponding multiplexers (610) through a plurality of touch lines (520) during the touch sensing periods (1T, 2T, 3T, 4T, 5T, 6T) of each frame, each touch group (1TG, 2TG, 3TG) having a first row of self-capacitance electrodes (510) that operate as a first sub-group (1) such that pixels (P) corresponding to the first sub-group (1) are driven during one displaying period (1D) of each frame, and having a second row of self-capacitance electrodes (520) that operate as a second sub-group (2) such that pixels (P) corresponding to the second sub-group (2) are driven during a subsequent displaying period (2D) of each frame.

The apparatus further includes: a plurality of gate lines (GL1-GLg) and data lines (DL1-DLd) connected to the array of pixels, wherein, at least one gate line (210) extends in a row direction for each sub-group (1, 2) and the plurality of data lines (DL) extend in a column direction for every sub-group (1, 2).

The plurality of gate lines (210) are in parallel with a plurality of touch lines (520) that connect the self-capacitance electrodes (510) to the plurality of multiplexers (610).

The array of pixels and the array of self-capacitance electrodes (510) are configured to determine a touch event and to compensate display-to-touch crosstalk (DTX) with DTX compensation data generated in view of a refreshed portion and an unrefreshed portion of the image of each frame.

The array of pixels and the array of self-capacitance electrodes (510) are further configured to use the DTX compensation data which is updated on the basis of the corresponding sub-group used for the refreshed portion of the image, wherein each sub-group is refreshed by supplying scan pulses to the gate lines (210) and supplying data voltages to data lines (DL).

At least two sub-groups are configured to transfer the touch sensing signals to the corresponding multiplexer (610) coupled to the at least two sub-groups which are both unrefreshed during a certain touch sensing period.

The plurality of gate lines (210) are arranged in a first direction; the plurality of data lines (DL) are arranged in a second direction, perpendicular to the first direction; the plurality of touch groups (1TG, 2TG, 3TG) includes the plurality of self-capacitance electrodes (510) and the plurality of touch lines (520) that receive a common voltage during the displaying period (1D, 2D, 3D, 4D, 5D, 6D). Here, the self-capacitance electrodes (510) are connected to the respective touch lines (520) in a one-to-one correspondence relationship and configured to receive touch driving signals (touch_EN) through the touch lines (520) and configured to transfer touch sensing signals through the touch lines (520) during a touch sensing period (1T, 2T, 3T, 4T, 5T, 6T) which is followed by the displaying period (1D, 2D, 3D, 4D, 5D, 6D). Also, each touch group (1TG, 2TG, 3TG) is arranged in the first direction such that at least one gate line (210) extends along each touch group (1TG, 2TG, 3TG) and the plurality of touch groups (1TG, 2TG, 3TG) are arranged in the second direction such that at least one data line (DL) extends along certain self-capacitance electrodes (510) in every touch group (1TG, 2TG, 3TG).

The touch groups (1TG, 2TG, 3TG) are divided into a plurality of sub-groups (1, 2, 3, 4, 5, 6), wherein, the plurality of sub-groups comprising a portion of the self-capacitance electrodes (510) are arranged along the first direction such that at least one gate line (210) is extended along only one sub-group (1, 2, 3, 4, 5, 6) and the plurality of sub-groups (1TG, 2TG, 3TG) are positioned in series along the second direction such that at least one data line (DL) extends along every sub-groups.

The apparatus further includes a touch sensing unit (600) configured to determine a touch event, wherein, display-to-touch crosstalk (DTX) is compensated with a DTX compensation data, wherein, the DTX compensation data is generated in view of an image refreshed portion and an image unrefreshed portion of the sub-groups.

The touch sensing unit (600) is configured to generate the DTX compensation data which is updated on the basis of the corresponding at least one refreshed sub-group, and each sub-group is configured to be refreshed by supplying scan pulses to the gate lines (210) and supplying data voltages to data lines (DL).

The touch sensing unit (600) further includes the plurality of multiplexers (610), and each touch group (1TG, 2TG, 3TG) is coupled to each multiplexer (610) respectively.

Each multiplexer (610) is configured to receive the touch sensing signals simultaneously from the at least two sub-groups (1, 2, 3, 4, 5, 6) which are coupled to the each multiplexer (Mux1, Mux2, Mux3).

During at least one touch sensing period (1T, 2T, 3T, 4T, 5T, 6T), the multiplexer (610) which is coupled to the at least two sub-groups is configured to receive the touch sensing signals corresponding to the at least two sub-groups which are both unrefreshed.

The apparatus further includes a timing controller (400) configured to generate a touch control signal wherein the touch control signal is configured to control an operation timing of the displaying periods (1D, 2D, 3D, 4D, 5D, 6D) and the touch sensing periods (1T, 2T, 3T, 4T, 5T, 6T).

Method for operating a display device includes: a panel (100) where a plurality of touch groups (1TG, 2TG, 3TG) each comprising a plurality of self-capacitance electrodes (510) are arranged along a plurality of gate lines (210); a touch sensing unit (600) configured to analyze a plurality of touch sensing signals sequentially received from the plurality of touch groups (1TG, 2TG, 3TG); a data driver (300) configured to respectively supply data voltages to a plurality of data lines (DL) provided on the panel (100) in a direction perpendicular to the plurality of touch groups (1TG, 2TG, 3TG); a gate driver (200) configured to sequentially supply a scan pulse to the plurality of gate lines (210); and a timing controller (400) configured to supply image data to the data driver (300), the method comprises the steps of: when one of a plurality of displaying periods (1D, 2D, 3D, 4D, 5D, 6D) within one frame period commences, sequentially supplying a scan pulse to a plurality of gate lines (210) arranged in a first direction of the panel (100), supplying a common voltage to an nth touch group (1TG, 2TG, 3TG), corresponding to a plurality of gate lines (210) to which the scan pulse is supplied, among a plurality of touch groups (1TG, 2TG, 3TG) which are arranged along the first direction, and displaying an image on a plurality of pixels (P) corresponding to the plurality of gate lines (210) to which the scan pulse is supplied; when one of a plurality of touch sensing periods (1T, 2T, 3T, 4T, 5T, 6T) included in the one frame period commences: analyzing a plurality of touch sensing signals received from an mth touch group (1TG, 2TG, 3TG) of the plurality of touch groups (1TG, 2TG, 3TG) to determine a touch event on a plurality of self-capacitance electrodes (510) configuring the mth touch group (1TG, 2TG, 3TG); and within the one frame period, repeatedly performing an operation of displaying the image and an operation of determining a touch event.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
    a plurality of gate lines arranged in a first direction;
    a plurality of data lines arranged in a second direction, perpendicular to the first direction;
    a plurality of pixels corresponding to the gate lines and the data lines; and
    a plurality of touch groups and a plurality of touch lines that receive a common voltage during a displaying period, each touch group including one or more rows of self-capacitance electrodes, and each of the rows including a plurality of self-capacitance electrodes arranged in a first direction,
    wherein, the self-capacitance electrodes are connected to the respective touch lines in a one-to-one correspondence relationship, and the self-capacitance electrodes are configured to receive touch driving signals through the touch lines and the self-capacitance electrodes are configured to transfer touch sensing signals through the same touch lines during a touch sensing period which is followed by the displaying period, and
    wherein, each touch group is arranged in the first direction such that at least one gate line extends along each touch group, and wherein the plurality of touch groups are arranged in the second direction such that at least one data line extends along certain self-capacitance electrodes in every touch group.

2. The display device of claim 1, wherein, the touch groups are divided into a plurality of sub-groups, and
    wherein, the plurality of sub-groups including a portion of the self-capacitance electrodes are arranged along the first direction such that at least one gate line is extended along only one sub-group and the plurality of sub-groups are positioned in series along the second direction such that at least one data line is extended along every sub-groups.

3. The display device of claim 2, further comprising a touch sensing unit configured to determine a touch event,
    wherein, display-to-touch crosstalk (DTX) is compensated with a DTX compensation data, and
    wherein, the DTX compensation data is generated in view of an image refreshed portion and an image unrefreshed portion of the sub-groups.

4. The display device of claim 3, wherein the touch sensing unit configured to generate the DTX compensation data which is updated on the basis of the corresponding at least one refreshed sub-group, and
    wherein each sub-group is configured to be refreshed by supplying scan pulses to the gate lines and supplying data voltages to data lines.

5. The display device of claim 4, the touch sensing unit further comprising a plurality of multiplexers, wherein, each touch group is coupled to each multiplexer respectively.

6. The display device of claim 5, wherein, each multiplexer is configured to receive the touch sensing signals simultaneously from the at least two sub-groups which are coupled to the each multiplexer.

7. The display device of claim 6, wherein, one frame period comprising a plurality of the displaying periods and a plurality of the touch sensing periods which are alternately arranged in sequence, during at least one touch sensing period, the multiplexer which is coupled to the at least two sub-groups is configured to receive the touch sensing signals corresponding to the at least two sub-groups which are both unrefreshed.

8. The display device of claim 1, further comprising a timing controller configured to generate a touch control signal wherein the touch control signal is configured to control an operation timing of the displaying periods and the touch sensing periods.

9. The display device of claim 1, wherein, the plurality of gate lines are positioned in parallel with the plurality of touch lines.

10. An apparatus comprising:
an array of pixels configured to provide images on a frame-by-frame basis, each frame including a plurality of displaying periods and a plurality of touch sensing periods which are alternately arranged in sequence; and
an array of self-capacitance electrodes that are grouped into a plurality of touch groups in a horizontal scan direction with each touch group connected to a single multiplexer among a plurality of multiplexers such that all of the self-capacitance electrodes receive touch driving signal through a plurality of the touch lines from corresponding multiplexers and all of the self-capacitance electrodes provide touch sensing signals to the corresponding multiplexers through the same plurality of touch lines during the touch sensing periods of each frame,
each touch group having a first row of a plurality of self-capacitance electrodes arranged in a horizontal direction, the first row operating as a first sub-group such that pixels corresponding to the first sub-group are driven during one displaying period of each frame, and said each tough group having a second row of a plurality of self-capacitance electrodes arranged in the horizontal direction, the second row operating as a second sub-group such that pixels corresponding to the second sub-group are driven during a subsequent displaying period of each frame.

11. The apparatus of claim 10, further comprising:
a plurality of gate lines and data lines connected to the array of pixels,
wherein, at least one gate line extends in a row direction for each sub-group and the plurality of data lines extend in a column direction for every sub-group.

12. The apparatus of claim 11, wherein, the plurality of gate lines are positioned in parallel with a plurality of touch lines that connect the self-capacitance electrodes to the plurality of multiplexers.

13. The apparatus of claim 12, wherein, the array of pixels and the array of self-capacitance electrodes are configured to determine a touch event and compensate display-to-touch crosstalk (DTX) with DTX compensation data generated in view of a refreshed portion and an unrefreshed portion of the image of each frame.

14. The apparatus of claim 13, wherein, the array of pixels and the array of self-capacitance electrodes are further configured to use the DTX compensation data which is updated on the basis of the corresponding sub-group used for the refreshed portion of the image, wherein each sub-group is refreshed by supplying scan pulses to the gate lines and supplying data voltages to data lines.

15. The apparatus of claim 14, wherein, at least two sub-groups are configured to transfer the touch sensing signals to the corresponding multiplexer coupled to the at least two sub-groups which are both unrefreshed during a certain touch sensing period.

* * * * *